(12) United States Patent
Yoshida et al.

(10) Patent No.: US 9,306,418 B2
(45) Date of Patent: Apr. 5, 2016

(54) UNINTERRUPTIBLE POWER-SUPPLY APPARATUS AND METHOD OF USING THE SAME

(71) Applicant: FUJITSU LIMITED, Kawasaki-shi, Kanagawa (JP)

(72) Inventors: Kensuke Yoshida, Kawasaki (JP); Tsutomu Tanaka, Kawasaki (JP); Tomochika Kurita, Kawasaki (JP); Tamotsu Yamamoto, Kawasaki (JP); Masaaki Sasa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 728 days.

(21) Appl. No.: 13/657,023

(22) Filed: Oct. 22, 2012

(65) Prior Publication Data

US 2013/0043729 A1 Feb. 21, 2013

Related U.S. Application Data

(63) Continuation of application No. PCT/JP2010/057674, filed on Apr. 30, 2010.

(51) Int. Cl.
*H02J 7/00* (2006.01)
*H02J 9/00* (2006.01)
*H02J 9/06* (2006.01)
*G06F 1/26* (2006.01)

(52) U.S. Cl.
CPC ............... *H02J 9/062* (2013.01); *G06F 1/263* (2013.01); *Y10T 307/62* (2015.04); *Y10T 307/625* (2015.04)

(58) Field of Classification Search
CPC ...... G06F 1/263; H02J 9/062; Y10T 307/625; Y10T 307/62
USPC ............................................. 307/65
See application file for complete search history.

(56) References Cited

U.S. PATENT DOCUMENTS

| 2007/0081308 A1 | 4/2007 | Ishida | |
|---|---|---|---|
| 2007/0217125 A1* | 9/2007 | Johnson | 361/600 |
| 2011/0115295 A1* | 5/2011 | Moon et al. | 307/65 |

FOREIGN PATENT DOCUMENTS

| JP | H8-20554 | 1/1996 |
|---|---|---|
| JP | 2005-86969 A1 | 3/2005 |
| JP | 2007-128498 A1 | 5/2007 |
| JP | 2007-202241 A1 | 8/2007 |
| JP | 2010-88211 A1 | 4/2010 |

OTHER PUBLICATIONS

International Search Report for International Application No. PCT/JP2010/057674 dated Aug. 10, 2010.
Office Action dated Sep. 3, 2014 corresponding to Chinese Patent Application No. 201080066526.X with English translation.

* cited by examiner

*Primary Examiner* — Rexford Barnie
*Assistant Examiner* — Toan Vu
(74) *Attorney, Agent, or Firm* — Kratz, Quintos & Hanson, LLP

(57) ABSTRACT

An uninterruptible power-supply apparatus has a storage battery including a first electrode and a second electrode, an output cable configured to output a discharge current of the storage battery to an external power line to be a backup target, and a first connection portion configured to externally take out a voltage of the first electrode.

17 Claims, 12 Drawing Sheets

US 9,306,418 B2

UNINTERRUPTIBLE POWER-SUPPLY APPARATUS AND METHOD OF USING THE SAME

CROSS-REFERENCE TO RELATED APPLICATION

This application is a continuation of International Patent Application No. PCT/JP2010/057674 filed Apr. 30, 2010 and designated the U.S., the entire contents of which are incorporated herein by reference.

FIELD

The embodiments discussed herein are related to an uninterruptible power-supply apparatus and a method of using the uninterruptible power-supply apparatus, and a server system.

BACKGROUND

Along with the recent development in the information communications technology, roles of server systems used for the Internet connections or storage are gradually becoming larger.

A server system has a power supply unit and a blade server mounted in one rack. Among them, the power supply unit is supplied with power from wirings in a premise of a data center and is used for supplying this power to the blade server. However, when a blackout occurs in the data center, the power is not supplied to the blade server.

For this reason, an uninterruptible power-supply apparatus such as a UPS (uninterruptible power supply) is sometimes provided in the rack of the server system in addition to the above-described power supply unit.

The uninterruptible power-supply apparatus includes a storage battery for backup. Thus, even though the blackout occurs in the data center as described above, the power generated from the storage battery is supplied to the blade server to prevent the operation of the blade server from being stopped due to the blackout.

As described above, the uninterruptible power-supply apparatus functions to back up the power of the server system and it is thus preferable to improve its performances.
PATENT DOCUMENT 1: Japanese Laid-open Patent Publication No. 08-20554
PATENT DOCUMENT 2: Japanese Laid-open Patent Publication No. 2007-202241

SUMMARY

According to one aspect of the following disclosure, an uninterruptible power-supply apparatus includes a storage battery including a first electrode and a second electrode, an output unit configured to output a discharge current of the storage battery to an external power line to be a backup target, and a first connection portion configured to externally take out a voltage of the first electrode.

In addition, according to another aspect of the disclosure, a server system includes a power line, a server electrically connected with the power line, and a plurality of uninterruptible power-supply apparatuses each including a storage battery including a first electrode and a second electrode, an output unit configured to output a discharge current of the storage battery to the power line, and a first connection portion electrically connected with the first electrode, wherein the respective first connection portions of the plurality of uninterruptible power-supply apparatuses are electrically connected with one another.

Furthermore, according to another aspect of the disclosure, a method of using an uninterruptible power-supply apparatus includes electrically connecting a first storage battery of a first uninterruptible power-supply apparatus and a second storage battery of a second uninterruptible power-supply apparatus with a power line to be a backup target, and electrically connecting the first storage battery and the second storage battery in parallel.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A is an outside drawing in which the interruptible power-supply system according to the first embodiment is seen from a front side, while

DESCRIPTION OF EMBODIMENTS

First Embodiment

Figure 1:
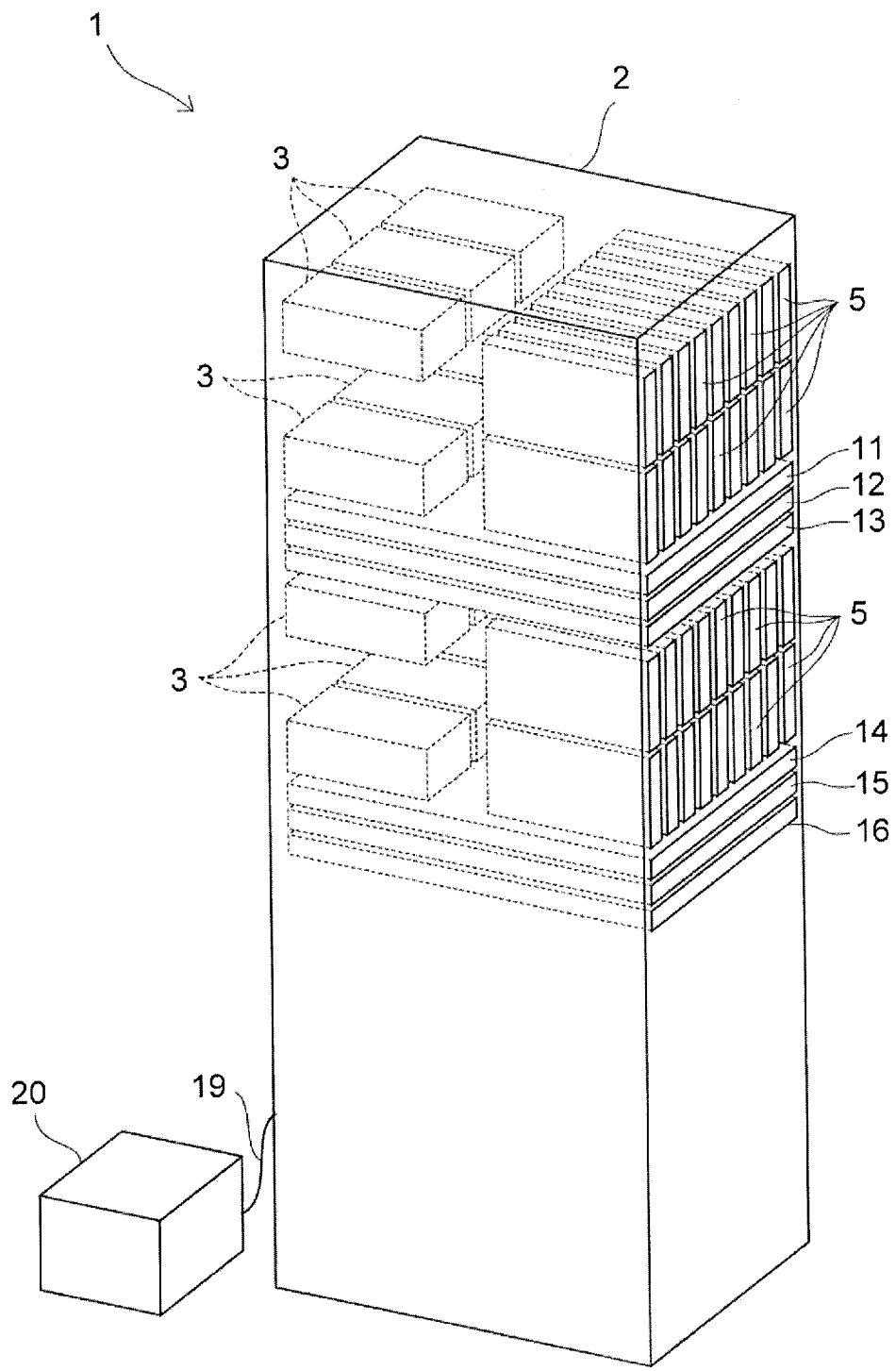
FIG. 1 is an outside drawing of a server system according to a first embodiment.

FIG. 1 is an outside drawing of a server system according to the present embodiment.

As depicted in FIG. 1, a server system 1 includes a rack 2 in which first to sixth uninterruptible power-supply apparatuses for backing up a power supply in the server system 1 are accommodated in the rack 2 in addition to a plurality of power supply units 3 and blade servers 5.

A switching control unit 20 is connected with the uninterruptible power-supply apparatuses 11 to 16 via a LAN cable 19. The switching control unit 20 is not particularly limited. In the present embodiment, a PC (Personal Computer) is used as the switching control unit 20.

Figure 2:
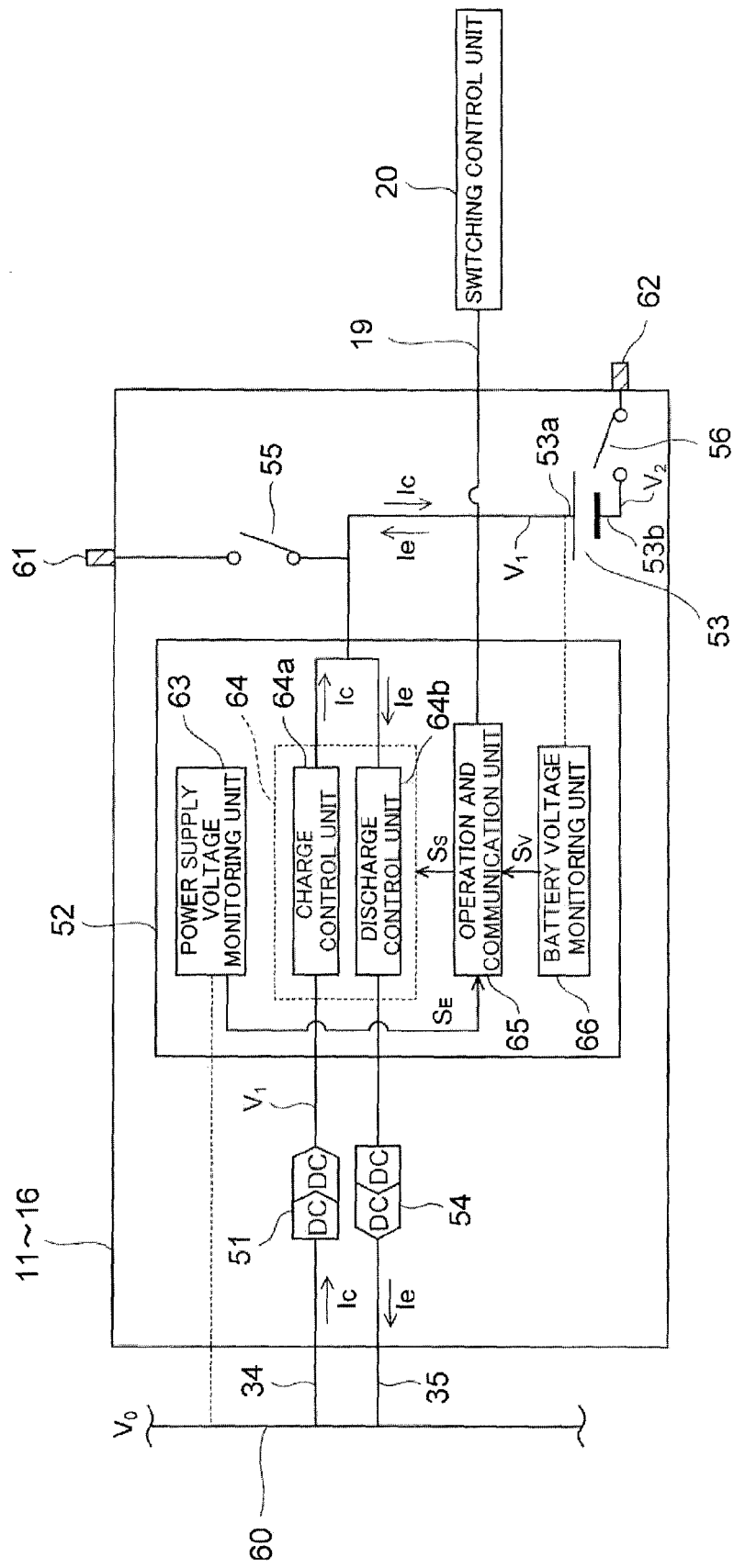
FIG. 2 is a functional block diagram of an uninterruptible power-supply apparatus according to the first embodiment.

FIG. 2 is a functional block diagram of the uninterruptible power-supply apparatuses 11 to 16.

Each of the uninterruptible power-supply apparatuses 11 to 16 includes a step-down DC-DC converter 51, a charge and discharge controller 52, a storage battery 53, and a step-up DC-DC converter 54.

Among them, the step-down DC-DC converter 51 steps down a power supply voltage $V_0$ of a direct current power line 60 in the rack 2 taken into via an input cable 34 and outputs a first voltage $V_1$ suitable for charging the storage battery 53.

The power supply voltage $V_0$ is not particularly limited, but it is assumed in the present embodiment that the power supply voltage $V_0$ be approximately 400 V.

In addition, the step-up DC-DC converter 54 steps up the first voltage $V_1$ of the storage battery 53 and outputs the power supply voltage $V_0$ to the direct current power line 60 via an output cable 35.

The storage battery 53 is, for example, a module in which a plurality of lithium ion batteries is connected in series or in parallel for supplying a predetermined amount of power. The first voltage $V_1$ of a first electrode 53a functioning as a positive electrode terminal of the module is not particularly limited, but it is, for example, approximately 36 V to 49.2 V. This voltage is a voltage in a case where 12 batteries with voltage values of 3 V to 4.1 V are connected in series.

Note that it is assumed in the present embodiment that a second electrode 53b functioning as a negative electrode of the storage battery 53 be a ground potential. Thus, a second voltage $V_2$ being a voltage of the second electrode 53b is constantly 0 V.

In each of the above-described first electrode 53a and second electrode 53b, a first connection portion 61 and a second connection portion 62 are provided for externally taking out each of the first voltage $V_1$ and second voltage $V_2$ from the uninterruptible power-supply apparatuses 11 to 16.

The Embodiment of the connection portions 61, 62 is not particularly limited. In the present embodiment, connectors are used as these connection portions 61, 62. Note that FIG. 2 is a functional block diagram depicting the connection relationship among components, in which a priority is put on providing an easily-viewable image. Thus, the connection portions 61, 62 are practically provided at positions different from those in FIG. 2 as described later.

Furthermore, a first switch 55 is provided between the first electrode 53a and the first connection portion 61, while a second switch 56 is provided between the second electrode 53b and the second connection portion 62.

A switching operation of the switches 55, 56 is performed by the switching control unit 20 via the LAN cable 19.

While each of the uninterruptible power-supply apparatuses 11 to 16 is in operation, these switches 55, 56 are constantly turned on under the control of the switching control unit 20. With this, the first electrode 53a and the first connection portion 61 are electrically connected with each other by the first switch 55 and the second electrode 53b and the second connection portion 62 are electrically connected with each other by the second switch 56.

Note that the switches 55, 56 are turned off when each of the uninterruptible power-supply apparatuses 11 to 16 is dismounted from the server system 1 for being exchanged or a new uninterruptible power-supply apparatus is added to the server system 1. This is described in a second embodiment.

The charge and discharge controller 52 includes a power supply voltage monitoring unit 63, a current control unit 64, an operation and communication unit 65, and a battery voltage monitoring unit 66.

Among them, the current control unit 64 is divided into a charge control unit 64a and a discharge control unit 64b based on functions thereof.

The charge control unit 64a functions to allow flow of a charge current $I_c$ of the storage battery 53, which enters the first electrode 53a. Also, the discharge control unit 64b functions to allow flow of a discharge current $I_e$ of the storage battery 53, which exits from the first electrode 53a.

In practical use, the current control unit 64 is in either a charge mode in which the charge current $I_c$ is selectively allowed to flow or a discharge mode in which the discharge current $I_e$ is selectively allowed to flow.

Among them, in the charge mode, the charge current $I_c$ is supplied to the storage battery 53 from the direct current power line 60, which results in charging the storage battery 53.

Also, in the discharge mode, the discharge current $I_e$ generated in the storage battery 53 is supplied to the output cable 35 provided as an output unit. Then, the discharge current $I_e$ is supplied to the direct current power line 60 from the output cable 35, so that the power of the direct current power line 60 may be backed up by the storage battery 53.

On the other hand, the power supply voltage monitoring unit 63 outputs power supply voltage information $S_E$ containing a voltage value of a voltage $V_0$ of the direct current power line 60 with respect to the operation and communication unit 65. Then, the battery voltage monitoring unit 66 outputs battery voltage information $S_V$ containing a voltage value of the first voltage $V_1$ of the storage battery 53 with respect to the operation and communication unit 65.

The operation and communication unit 65 instructs the current control unit 64 that an operation is performed in either the above-described charge mode or discharge mode in response to these pieces of information $S_E$, $S_V$.

For example, when it was found by the power supply voltage information $S_E$ that the power supply voltage $V_0$ of the direct current power line 60 is decreased to be equal to or lower than a reference voltage $V_r$, the operation and communication unit 65 determines that the backup of the direct current power line 60 preferably is needed and instructs the current control unit 64 to operate in the discharge mode.

Note that the reference voltage $V_r$ of the direct current power line 60, which becomes as a reference for determining if the backup preferably is needed, is, for example, 380 V.

On the other hand, when it was found by the power supply voltage information $S_E$ that the power supply voltage $V_0$ of the direct current power line 60 restores the reference voltage $V_r$, the operation and communication unit 65 determines that the backup of the direct current power line 60 preferably is not needed and instructs the current control unit 64 to operate in the charge mode.

When the storage battery 53 is a lithium ion battery, a magnitude of a charge current $I_C$ in the charge mode is set by the charge control unit 64a to be a constant current of approximately 0.2 C (C is a discharge rate) suitable for charging.

Also, in the charge mode, the charge control unit 64a monitors the first voltage $V_1$ via the battery voltage monitoring unit 66. In addition, when the charge control unit 64a detects that the first voltage $V_1$ is 49.2 V which is a charge upper-limit voltage of the lithium ion battery, an output voltage of the charge control unit 64a is set to be a constant voltage of 49.2 V. If a predetermined constant voltage charge time, for example, one hour has past in that state, the charge control unit 64a terminates the charging of the storage battery 53.

Furthermore, the operation and communication unit 65 is electrically connected with the switching control unit 20 via the LAN cable 19. The contents of communications between the switching control unit 20 and the operation and communication unit 65 and the contents of operations of the switching control unit 20 are described in the second embodiment to be described later.

Figure 3:
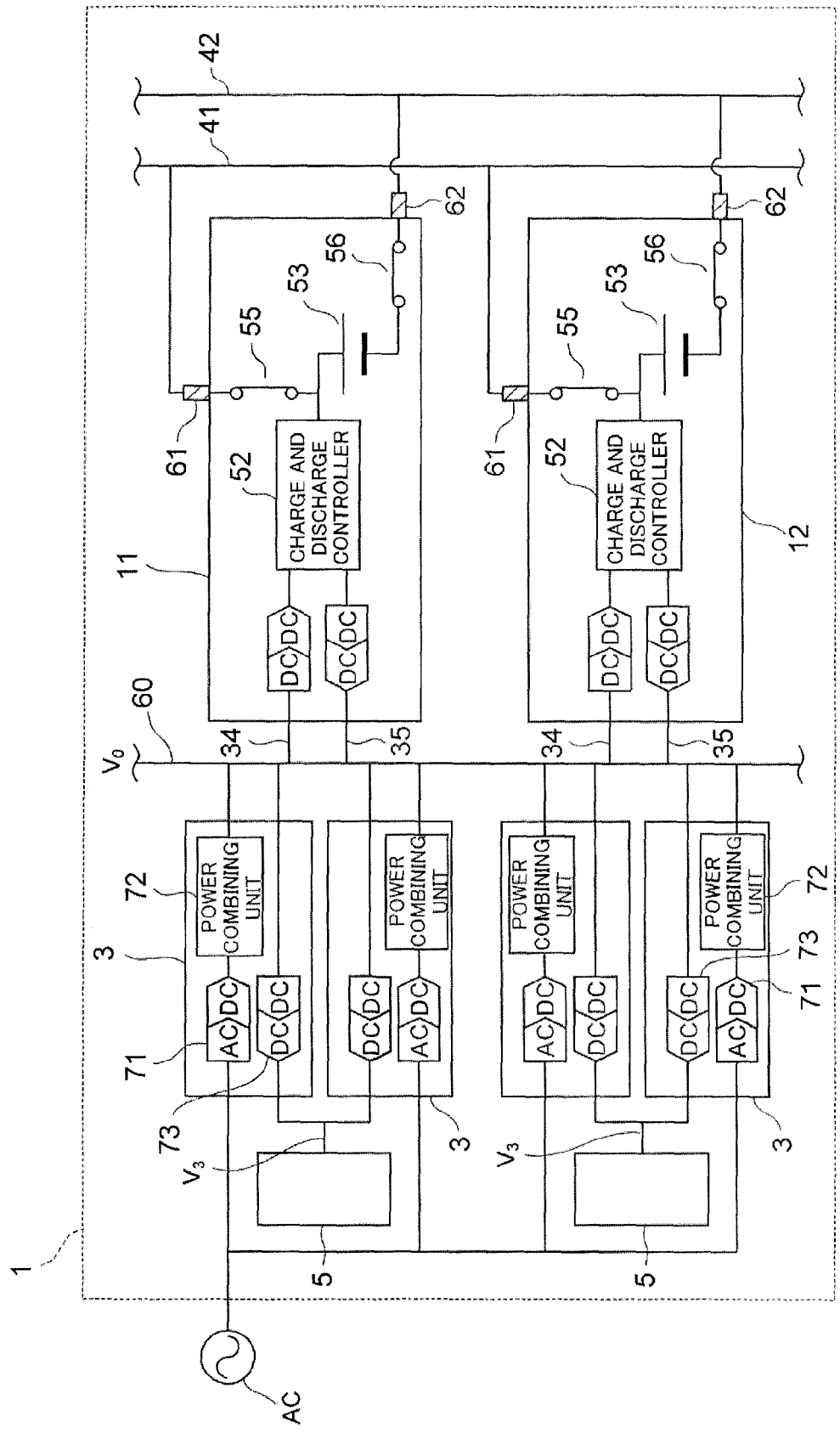
FIG. 3 is a schematic diagram depicting an example of connection among uninterruptible power-supply apparatuses, a power supply units, and blade servers.

FIG. 3 is a schematic diagram depicting an example of connection among the uninterruptible power-supply apparatuses 11 to 16, the power supply units 3, and the blade servers 5 in the server system 1. Note that the third to sixth uninterruptible power-supply apparatuses 13 to 16 connected with the direct current power line 60 are omitted in FIG. 3 for simplifying the drawing.

As depicted in FIG. 3, the server system 1 operates in a state of being connected with an alternate current power supply AC in the premise of the data center. A rated frequency of the alternate current power supply AC is, for example, 50 Hz or 60 Hz, and a voltage value thereof is 100 V or 200 V.

The power supply unit 3 has an AC-DC converter 71 for converting an alternate current voltage of the alternate current power supply AC to the direct current voltage, a power combining unit 72, and a step-down DC-DC converter 73.

The power combining unit 72 functions so as to maintain a voltage of the direct current power line 60 at the power supply voltage $V_0$ by adjusting output power which is output from the AC-DC converter 71.

Also, the step-down DC-DC converter 73 steps down the power supply voltage $V_0$ to a third voltage $V_3$ of approximately 12 V, which is supplied to the blade server 5 as a driving voltage.

One blade server 5 executes a predetermined operation such as an operation or storage in response to the reception of the supplies of the third voltage $V_3$ from the two power supply units 3.

Note that the two power supply units 3 are used in pair and these two may supply the third voltage $V_3$ to the six blade servers 5.

In addition, the server system 1 is provided with a first wiring 41 and a second wiring 42.

Among them, the first wiring 41 is electrically connected with the respective first connection portions 61 of the uninterruptible power-supply apparatuses 11 to 16. In addition, the second wiring 42 is electrically connected with the respective second connection portions 62 of the first and second uninterruptible power-supply apparatuses 11, 12.

In the present embodiment, the wirings 41, 42 are provided as described above, so that the respective storage batteries 53 of the uninterruptible power-supply apparatuses 11 to 16 are electrically connected in parallel when the switches 55, 56 are the on state.

Figure 4A:
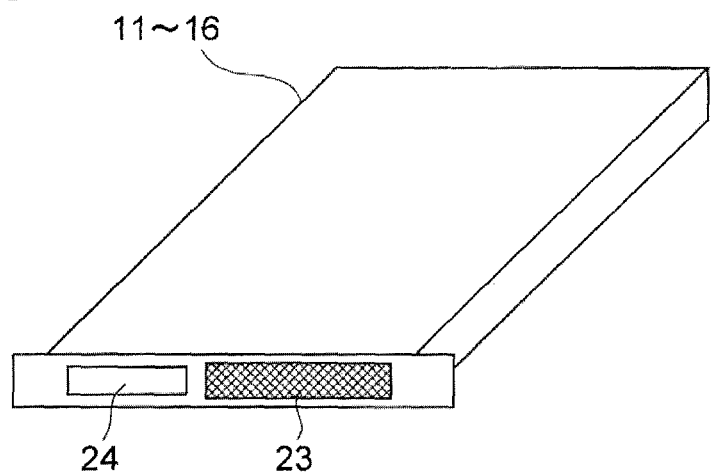

FIG. 4A is an outside drawing in which each of the uninterruptible power-supply apparatuses 11 to 16 is seen from the front side.

An air intake hole 23 through which cooling air is taken and an information display unit 24 indicating an operation status of each of the uninterruptible power-supply apparatuses 11 to 16 are provided on the front surface of each of the uninterruptible power-supply apparatuses 11 to 16.

Figure 4B:
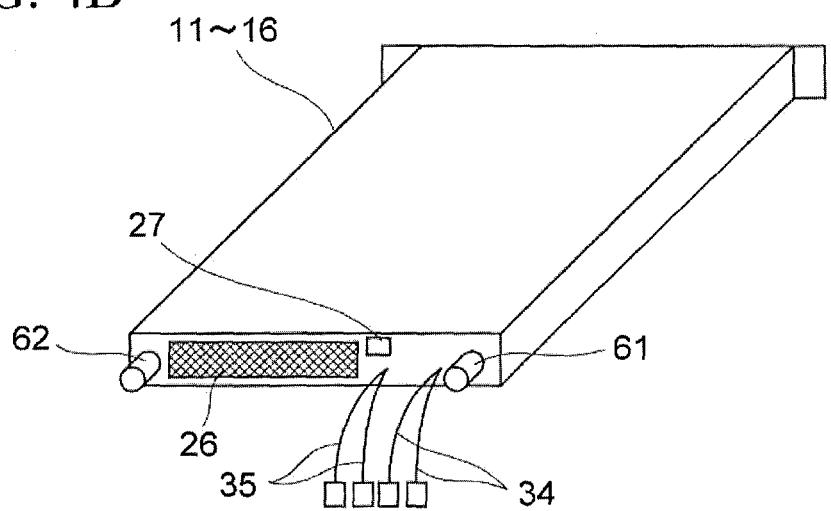
FIG. 4B is an outside drawing in which the interruptible power-supply system according to the first embodiment is seen from a rear side.

On the other hand, FIG. 4B is an outside drawing in which each of the uninterruptible power-supply apparatuses 11 to 16 is seen from the rear side.

On the respective rear surfaces of the uninterruptible power-supply apparatuses 11 to 16, an air discharge hole 26 through which the used cooling air is discharged and an insertion port 27 into which the LAN cable 19 (see FIG. 1) is inserted are provided.

Furthermore, on the rear surface thereof, the above-described first and second connection portions 61, 62 are provided in a protruded manner in addition to the input cable 34 for taking in the power supply voltage $V_0$ and the output cable 35 serving as an output unit to output a voltage for backing up the power supply voltage $V_0$.

Figure 5:
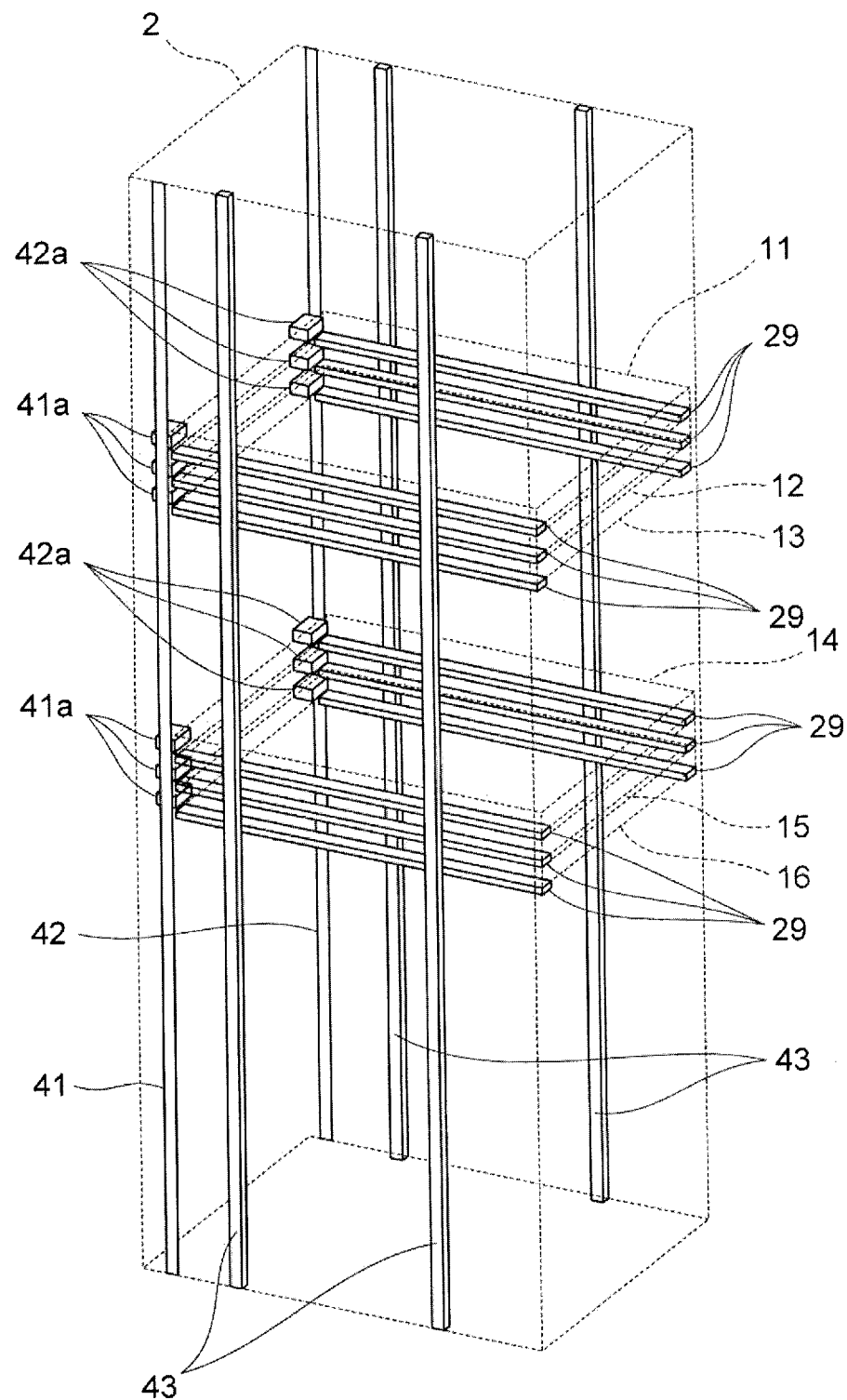
FIG. 5 is a schematic diagram depicting an internal structure of a rack of the server system according to the first embodiment.

FIG. 5 is a schematic diagram depicting an internal structure of the rack 2.

As depicted in FIG. 5, a plurality of metal guide rails 29 which horizontally extends in a state of being supported by pillars 43, and the first wiring 41 and second wiring 42 which vertically extend are provided on an inner wall of the rack 2.

The uninterruptible power-supply apparatuses 11 to 16 slidingly move on the guide rails 29 manually when they are accommodated in the rack 2 and are guided to the inside of the rack 2 by the guide rails 29.

On the other hand, the first wiring 41 and the second wiring 42 are used to connect the respective storage batteries 53 in the uninterruptible power-supply apparatuses 11 to 16 in parallel as described by referring to FIG. 3.

Figure 6:
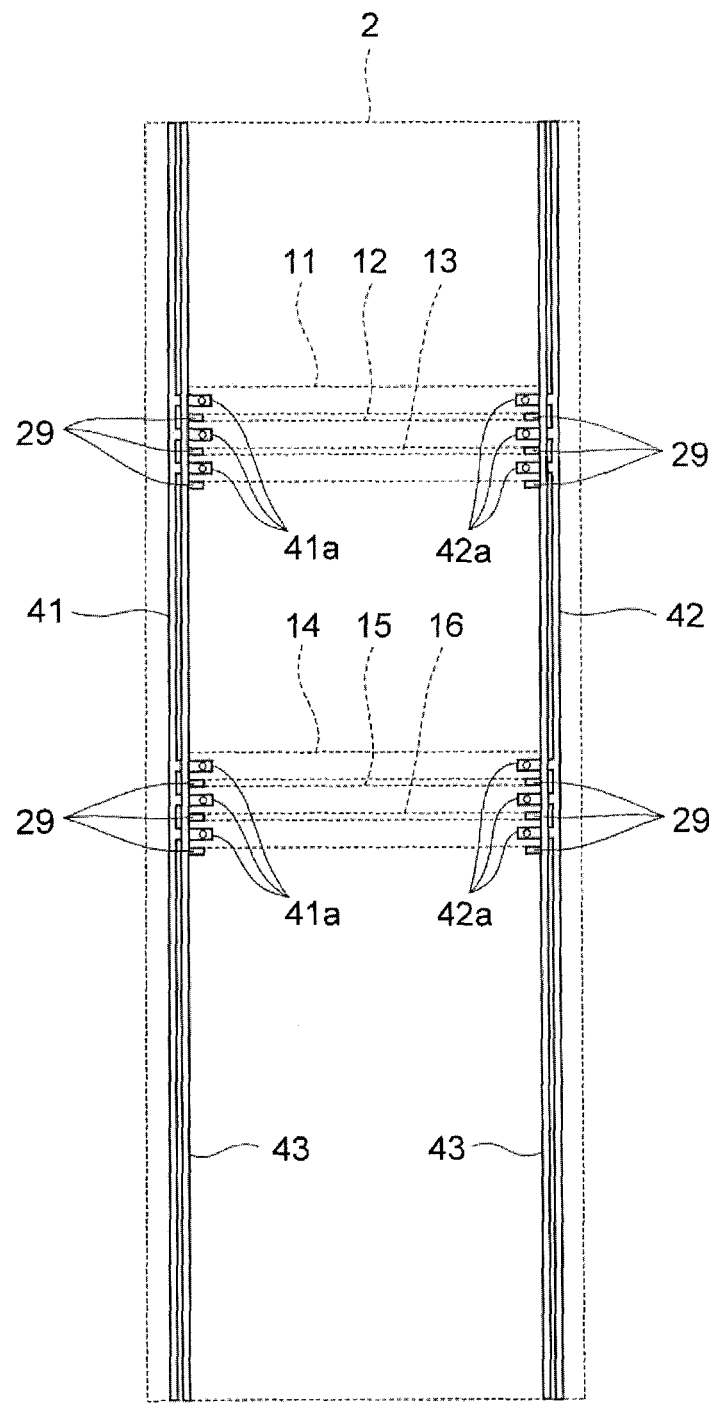
FIG. 6 is a schematic diagram in which the rack of the server system according to the first embodiment is seen from the front side.

FIG. 6 is a schematic drawing in which the rack 2 is seen from the front side.

As depicted in FIG. 2, a plurality of first fitting portions 41a to be fitted to the respective first connection portions 61 (see FIG. 4B) of the uninterruptible power-supply apparatuses 11 to 16 are provided to the first wiring 41. Similarly, a plurality of second fitting portions 42a to be fitted to the respective second connection portions 62 of the uninterruptible power-supply apparatuses 11 to 16 are provided to the second wiring 42.

The form of each of the fitting portions 41a, 42a is not particularly limited, but in the present embodiment, connector acceptance holes are employed as these fitting portions 41a, 42a.

Figure 7:
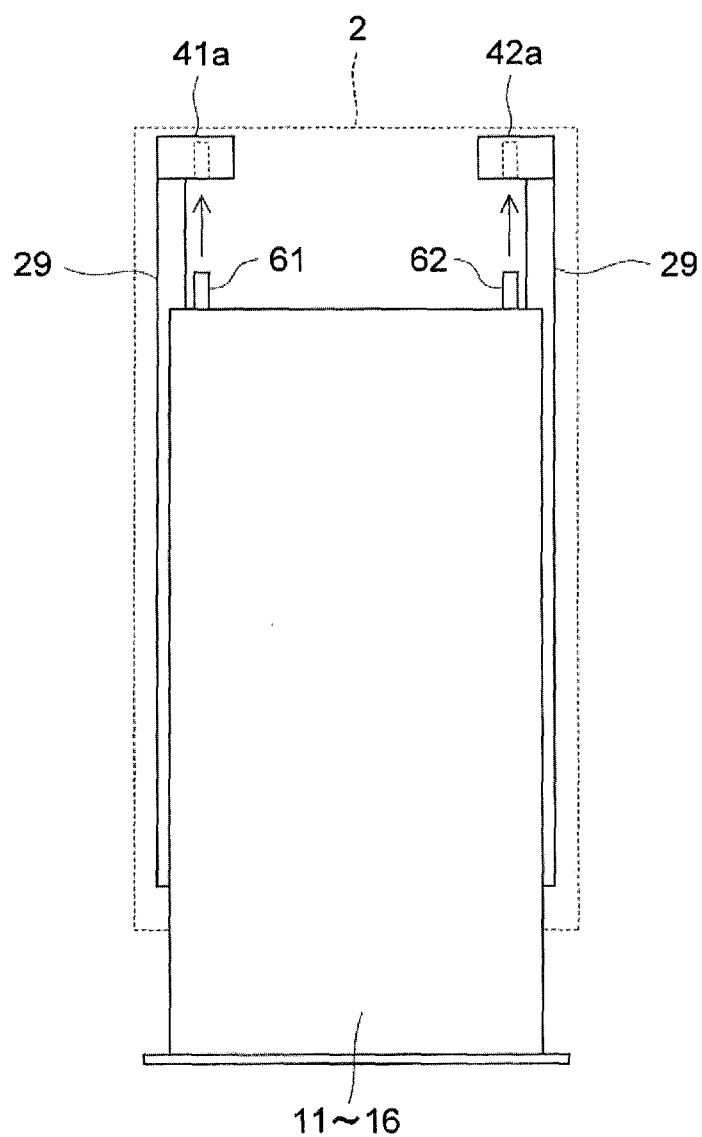
FIG. 7 is a top view depicting that the interruptible power-supply apparatus is accommodated in the rack of the server system according to the first embodiment.

FIG. 7 is a top view when each of the uninterruptible power-supply apparatuses 11 to 16 is accommodated in the rack 2.

As depicted in FIG. 7, when each of the uninterruptible power-supply apparatuses 11 to 16 is accommodated in the rack 2 along the guide rails 29, the first and second connection portions 61, 62 are respectively fitted to the first and second fitting portions 41a, 42a as a result.

With this, the first and second connection portions 61, 62 are respectively electrically connected with the first and second fitting portions 41a, 42a, so that the respective storage batteries 53 of the uninterruptible power-supply apparatuses 11 to 16 may be connected in parallel by the wirings 41, 42 as depicted in FIG. 3.

Figure 8:
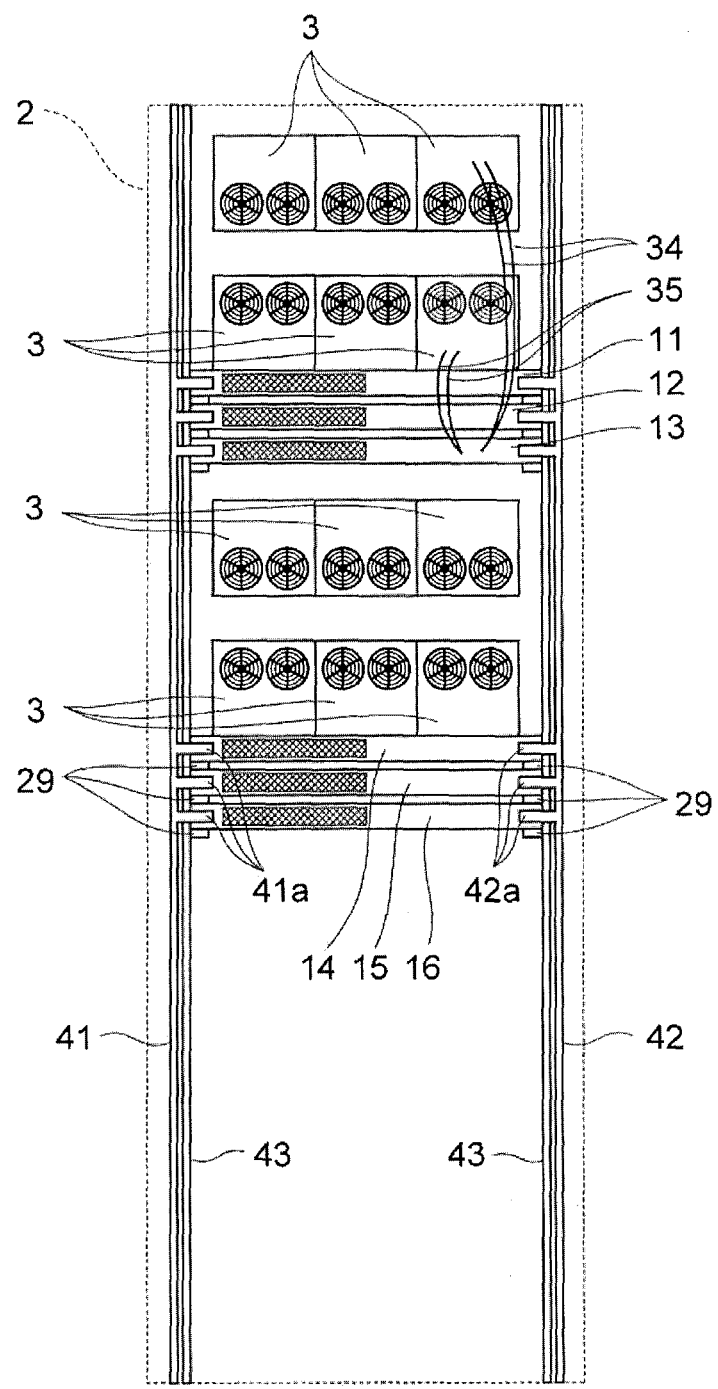
FIG. 8 is a rear surface of the rack of the server system according to the first embodiment.

FIG. 8 is a rear surface of the rack 2.

As depicted in FIG. 8, the input cable 34 and output cable 35 of the third uninterruptible power-supply apparatus 13 are connected with the power supply unit 3. Note that although omitted in FIG. 3 to avoid complication of the drawing, the cables 34, 35 of the remaining uninterruptible power-supply apparatuses 11, 12, 14 to 16 are also connected with the power supply unit 3.

With this, the uninterruptible power-supply apparatuses 11 to 16 may be connected with the power supply unit 3 in a state as illustrated in FIG. 3 and the direct current power line 60 in the rack 2 may be backed up by the uninterruptible power-supply apparatuses 11 to 16.

According to the above-described embodiment, as described by referring to FIG. 3, the respective storage batteries 53 of the first and second uninterruptible power-supply apparatuses 11, 12 are connected in parallel via the wirings 41, 42.

Figure 9:
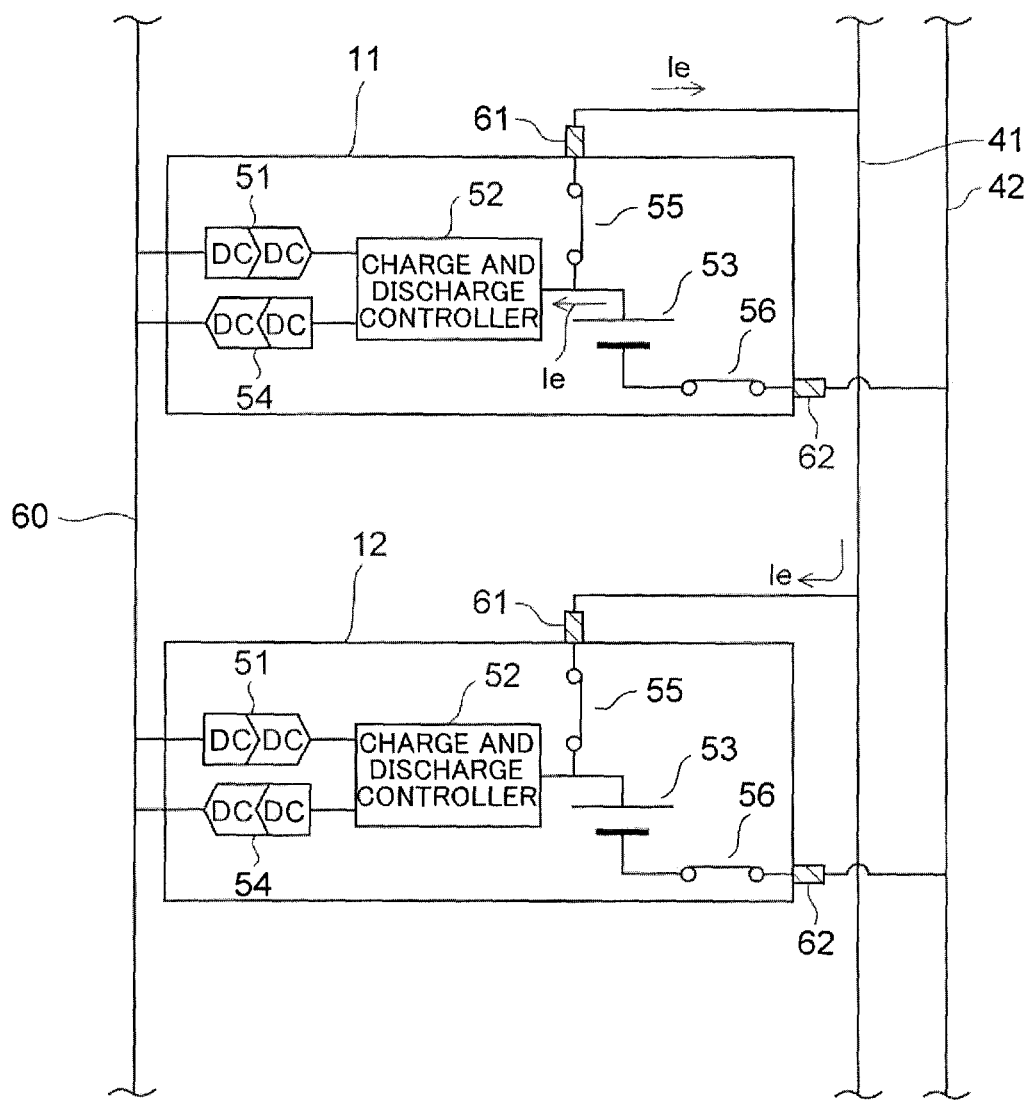
FIG. 9 is a schematic drawing for illustrating advantages obtainable by the server system according to the first embodiment.

FIG. 9 is a schematic diagram for illustrating advantages obtainable from the above.

As depicted in FIG. 9, in the present embodiment, the plurality of the uninterruptible power-supply apparatuses 11, 12 is provided to the direct current power line 60 to be a backup target with an intention of causing the direct current power line 60 to be redundant.

At this time, if the charge and discharge controller 52 of the first uninterruptible power-supply apparatus 11 operates normally, the discharge current I, of the storage battery 53 of the first uninterruptible power-supply apparatus may be supplied to the direct current power line 60 via that charge and discharge controller 52.

However, if the charge and discharge controller 52 of the first uninterruptible power-supply apparatus 11 breaks down, the discharge current $I_e$ of that storage battery 53 is not taken through the charge and discharge controller 52 even though the storage battery 53 of the first uninterruptible power-supply apparatus 11 operates normally.

Since even in such a case, the plurality of the storage batteries 53 is connected in parallel in the present embodiment, the discharge current $I_e$ of the storage battery 53 of the first uninterruptible power-supply apparatus 11 is supplied to the second uninterruptible power-supply apparatus 12 which does not break down via the first wiring 41. Then, the discharge current $I_e$ of the storage battery of the first uninterruptible power-supply apparatus 11 is supplied to the direct current power line 60 through the normal charge and discharge controller 52 of the second uninterruptible power-supply apparatus 12.

Accordingly, even if the charge and discharge controller 52 of any of the uninterruptible power-supply apparatuses 11 to 16 breaks down, the direct current power line 60 may be backed up with sufficient power using the power supply capability of the storage battery 53 which does not break down.

Second Embodiment

The present embodiment describes a method of dismounting the uninterruptible power-supply apparatuses described in the first embodiment from the server system and mounting the uninterruptible power-supply apparatuses described in the first embodiment in the server system.

During the dismounting or mounting, the switches 55, 56 of an uninterruptible power-supply apparatus to be a dismounting or mounting target are controlled as below by the switching control unit 20.

Figure 10:
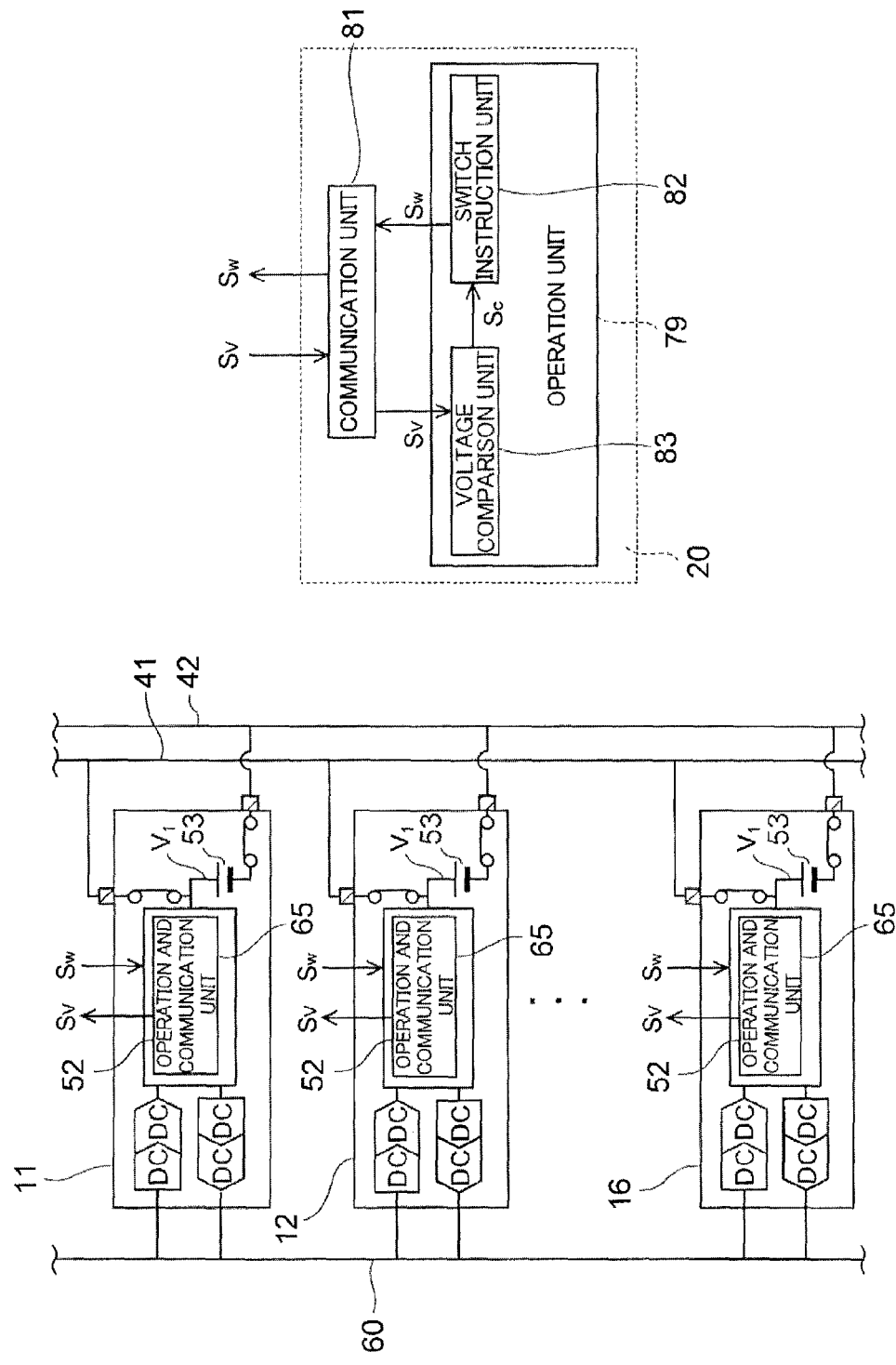
FIG. 10 is a functional block diagram of uninterruptible power-supply apparatuses and a switching control unit according to a second embodiment.

FIG. 10 is a functional block diagram of uninterruptible power-supply apparatuses 11 to 16 and the switching control unit 20. Note that in these drawings, same reference numerals are given to denote components same as those described in the first embodiment and the description thereof is omitted.

The switching control unit 20 has a communication unit 81 and an operation unit 79 such as a CPU (Central Processing Unit). Among them, the operation unit 79 is divided into a switch instruction unit 82 and a voltage comparison unit 83 based on functions thereof.

The communication unit 81 performs communications with the respective operation and communication units 65 of the uninterruptible power-supply apparatuses 11 to 16 via the LAN cable 19 (see FIG. 1). During the communications, the operation and communication unit 65 outputs the battery voltage information $S_V$ received from the battery voltage monitoring unit 66 (see FIG. 2) to the communication unit 81. As described in the first embodiment, the battery voltage information $S_V$ contains a voltage value of the first voltage $V_1$ of the storage battery 53 included in each of the uninterruptible power-supply apparatuses 11 to 16.

Note that the battery voltage information $S_V$ also contains system identification information for identifying any of the uninterruptible power-supply apparatuses, which outputs the battery voltage information $S_V$. Based on the system identification information, the communication unit 81 may specify a source of the battery voltage information $S_V$.

The voltage comparison unit 83 compares the first voltages $V_1$ in any two of the uninterruptible power-supply apparatuses based on the voltage value of the first voltage $V_1$ contained in the battery voltage information $S_V$, so that a voltage difference $\Delta V$ of the respective storage batteries 53 of these two uninterruptible power-supply apparatuses is calculated.

For example, the respective first voltages $V_1$ of the first uninterruptible power-supply apparatus 11 and the second uninterruptible power-supply apparatus 12 are compared with each other and a voltage difference $\Delta V$ defined by the difference between these voltages $V_1$ is calculated.

Note that a system to be a target to be compared with the first voltage $V_1$ is not limited to the first uninterruptible power-supply apparatus 11 and the second uninterruptible power-supply apparatus 12.

For example, the first voltages $V_1$ may be compared in any one of the third to sixth uninterruptible power-supply apparatuses 13 to 16 and the first uninterruptible power-supply apparatus 11. Furthermore, a mean value of the first voltages $V_1$ of the second to sixth uninterruptible power-supply apparatuses 12 to 16 may be compared with the first voltage $V_1$ of the first uninterruptible power-supply apparatus 11.

Then, based on such a comparison result, the voltage comparison unit 83 notifies the switch instruction unit 82 of voltage comparison information $S_C$ containing the voltage difference $\Delta V$ between the storage batteries 53 of any two uninterruptible power-supply apparatuses.

The switch instruction unit 82 outputs a switching signal $S_W$ of the first switch 55 and the second switch 56 to the communication unit 81 based on the voltage comparison information $S_C$.

The switching signal $S_W$ is output to the uninterruptible power-supply apparatuses 11 to 16 via the communication unit 81. Accordingly, the switching on and off of the switches 55, 56 of the uninterruptible power-supply apparatuses 11 to 16 is controlled.

Note that although a PC is used as the switching control unit 20 in the present example, any of the blade servers 5 may be caused to have a function of such switching control unit 20.

Hereinafter, the switching operations of the switches 55, 56 utilizing the switching signal $S_W$ are described in a case where a new uninterruptible power-supply apparatus is added to the server system 1 and a case where an uninterruptible power-supply apparatus is dismounted from the server system 1.

(i) The Case where an Uninterruptible Power-Supply Apparatus is Added to the Server System 1

Figure 11:
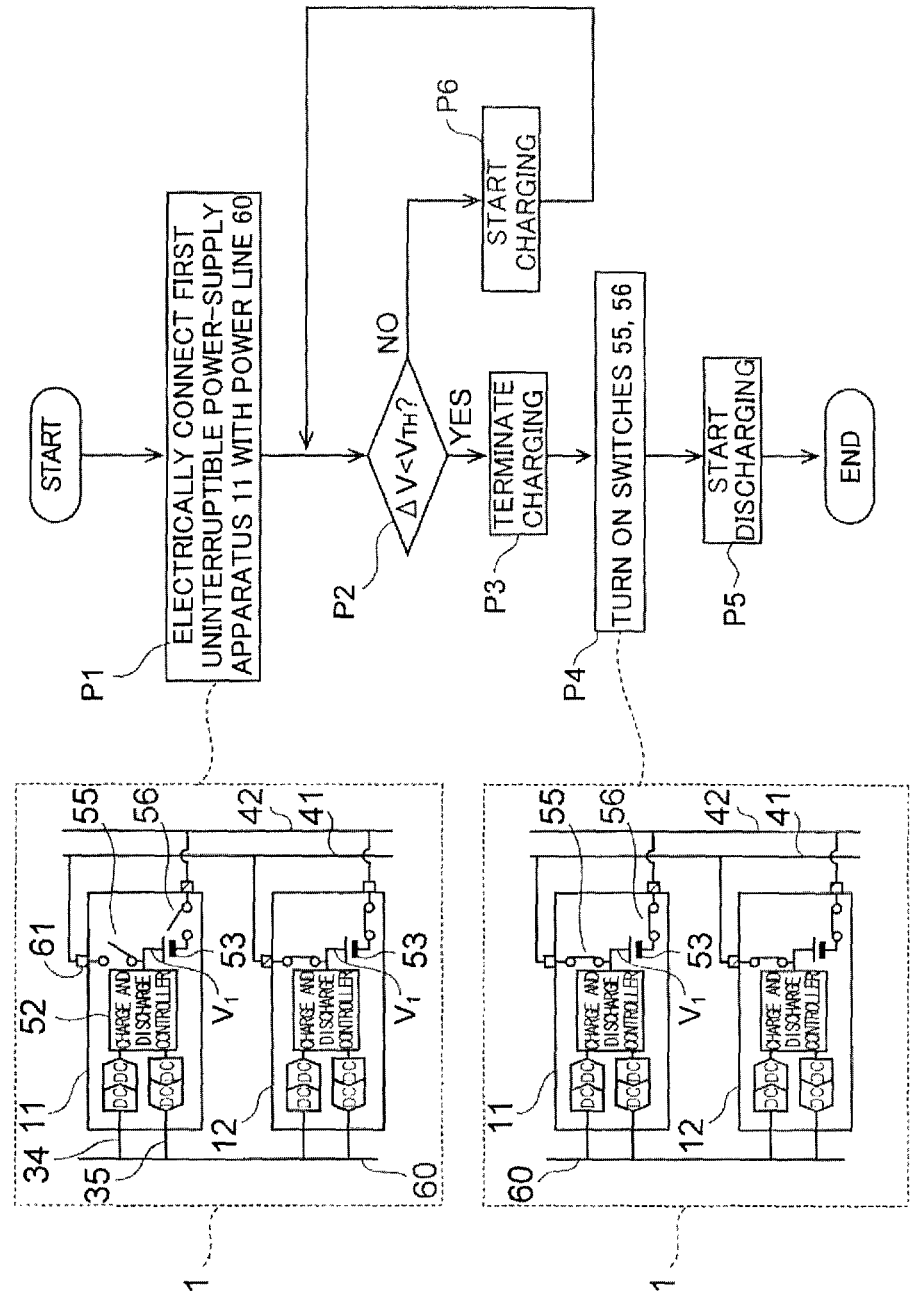
FIG. 11 is a flowchart illustrating a method of using an uninterruptible power-supply apparatus when a new uninterruptible power-supply apparatus is added to the server system in the second embodiment.

FIG. 11 is a flowchart illustrating a method of using an uninterruptible power-supply apparatus when a new uninterruptible power-supply apparatus is added to the server system 1.

The present example is useful when a new uninterruptible power-supply apparatus is added after the broken uninterruptible power-supply apparatus is dismounted from the server system 1.

The description is given below to a case where the first uninterruptible power-supply apparatus 11 out of the uninterruptible power-supply apparatuses 11 to 16 is added. However, a similar method is employed for a case where the remaining uninterruptible power-supply apparatuses 12 to 16 are added.

At first step P1, the input cable 34 and output cable 35 of the first uninterruptible power-supply apparatus 11 are connected with the power supply unit 3 (see FIG. 1) in a state where the switches 55, 56 of the first uninterruptible power-supply apparatus 11 is opened.

With this, the first uninterruptible power-supply apparatus 11 is electrically connected with the direct current power line 60 via the cables 34, 35 in the inside of the server system 1.

Note that since the switches 55, 56 are still opened at this stage, the respective storage batteries 53 of the first uninterruptible power-supply apparatus 11 and the second uninterruptible power-supply apparatus 12 are electrically disconnected with each other.

Also, at the same time, the LAN cable 19 (see FIG. 1) is inserted into the rear surface of the first uninterruptible power-supply apparatus 11. Accordingly, the switching control unit 20 (see FIG. 10) may acquire battery voltage information $S_V$ of the first uninterruptible power-supply apparatus 11 via the LAN cable 19.

Hereafter, proceeding to step P2, the voltage comparison unit 83 of the switching control unit 20 calculates a voltage difference $\Delta V$ between the respective storage batteries 53 of the first uninterruptible power-supply apparatus 11 and the second uninterruptible power-supply apparatus 12 and determines if the voltage difference $\Delta V$ is smaller than a predetermined voltage $V_{TH}$.

Note that the voltage difference $\Delta V$ in the present example means a value in which the first voltage $V_1$ in the first uninterruptible power-supply apparatus 11 is subtracted from the first voltage $V_1$ in the second uninterruptible power-supply apparatus 12. The first voltage $V_1$ in the second uninterruptible power-supply apparatus 12 is applied to the first connection portion 61 of the first uninterruptible power-supply apparatus 11. Accordingly, the voltage difference $\Delta V$ is equal to a voltage difference between the first connection portion 61 of the first uninterruptible power-supply apparatus 11 and the positive electrode of the storage battery 53.

Here, when it is determined that the voltage difference $\Delta V$ of the storage battery 53 is larger than the predetermined threshold $V_{TH}$, it means that the storage battery 53 in the first uninterruptible power-supply apparatus 11 is short of battery charge as compared with the storage battery 53 in the second uninterruptible power-supply apparatus 12.

For this reason, when the switches 55, 56 of the first uninterruptible power-supply apparatus 11 are turned on in that state, a current is excessively supplied from the storage battery 53 of the second uninterruptible power-supply apparatus 12 to the storage battery 53 of the first uninterruptible power-supply apparatus 11, which has a lower voltage. In such a case, the excessive current increases a danger of damaging the storage battery 53 of the first uninterruptible power-supply apparatus 11 and the charge and discharge controller 52 due to the heat generation.

For this reason, when it is determined at step P2 that the voltage difference $\Delta V$ is equal to or larger than the predetermined value $V_{TH}$, the step proceeds to step P6 and the storage battery 53 of the first uninterruptible power-supply apparatus 11 is charged with the switches 55, 56 being turned off under the control of the switch instruction unit 82.

The battery charge is performed by causing the charge and discharge controller 52 to be in the charge mode and supplying a charge current $I_c$ to the storage battery 53 of the first uninterruptible power-supply apparatus 11 from the direct current power line 60.

Then, step P2 is performed again after a predetermined time period has past. When it is determined at the step P2 that the voltage difference $\Delta V$ is smaller than the predetermined value $V_{TH}$, the step proceeds to step P3, and the battery charge of the storage battery 53 of the first uninterruptible power-supply apparatus 11 is terminated.

Note that the predetermined value $V_{TH}$ is not particularly limited, but it is, for example, approximately 10 mV. Also, in some cases, it may be also possible that the predetermined value $V_{TH}$ is not used at step P2, but the step proceeds to step P3 when the first voltages $V_1$ of the respective storage batteries 53 of the uninterruptible power-supply apparatuses 11, 12 are equal to each other, and, if not, the step proceeds to step P6.

Hereinafter, proceeding to step P4, the switching control unit 20 outputs a switching signal $S_W$ to the first uninterruptible power-supply apparatus 11, so that the switches 55, 56 of the first uninterruptible power-supply apparatus 11 are turned on.

Even though the switches 55, 56 are turned on in this manner, since the shortage of the battery charge in the storage battery 53 of the first uninterruptible power-supply apparatus 11 is resolved after the steps P2, P6, there is not such a case that an excessive current is supplied to the storage battery 53 of the first uninterruptible power-supply apparatus 11 from the storage battery 53 of the second uninterruptible power-supply apparatus 12.

In addition, since the switches 55, 56 are turned on, the respective storage batteries 53 of the first uninterruptible power-supply apparatus 11 and the second uninterruptible power-supply apparatus 12 are connected in parallel via the first wiring 41 and the second wiring 42.

Thereafter, proceeding to step P5, the charge and discharge controller 52 of the first uninterruptible power-supply apparatus 11 is caused to be in the discharge mode. With this, the discharge current $I_e$ is supplied from the storage battery 53 of the first uninterruptible power-supply apparatus 11 to the direct current power line 60, so that the backup of the direct current power line 60 is started by the first uninterruptible power-supply apparatus 11.

As described above, the basic steps of the method of using an uninterruptible power-supply apparatus according to the present example is terminated.

In this example, when battery charge of the storage battery 53 of the newly-mounted first uninterruptible power-supply apparatus 11 is insufficient, after this storage battery 53 is charged at step P6, the respective storage batteries 53 of the first uninterruptible power-supply apparatus 11 and the second uninterruptible power-supply apparatus 12 are connected in parallel at step P4.

This may prevent the excessive current from being supplied from the storage battery 53 of the second uninterruptible power-supply apparatus 12 to the storage battery 53 of the first uninterruptible power-supply apparatus 11, whose battery charge is insufficient. Thus, the storage battery 53 of the first uninterruptible power-supply apparatus 11 may reduce a danger of being damaged by the excessive current.

(ii) The Case where an Uninterruptible Power Supply Apparatus is Dismounted from the Server System 1

Figure 12:
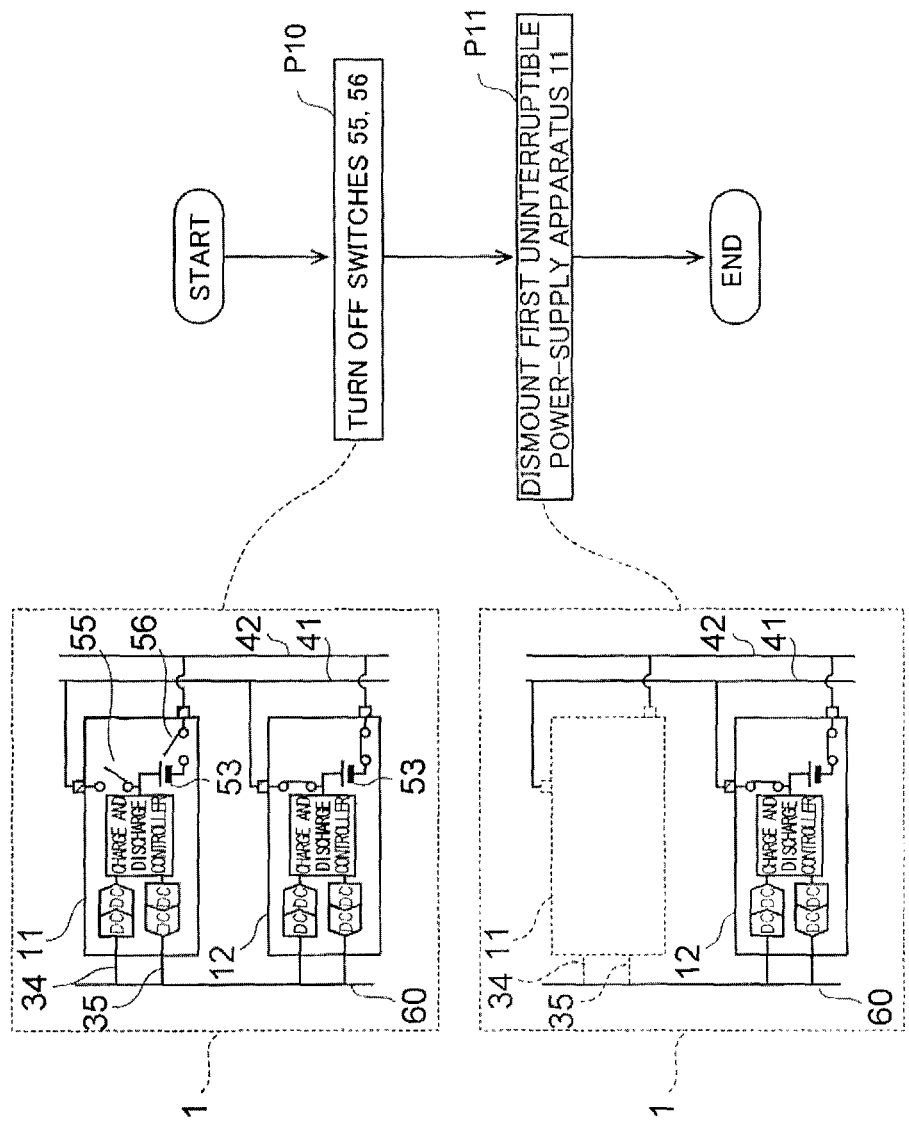
FIG. 12 is a flowchart illustrating a method of using an uninterruptible power-supply apparatus when an uninterruptible power-supply apparatus is dismounted from the server system.

FIG. 12 is a flowchart illustrating a method of using an uninterruptible power-supply apparatus when an uninterruptible power-supply apparatus is dismounted from the server system 1.

The present example is useful when a broken uninterruptible power-supply apparatus is dismounted from the server system 1 for being exchanged.

The description is given below to a case where the first uninterruptible power-supply apparatus 11 out of the uninterruptible power-supply apparatuses 11 to 16 is dismounted. However, a similar method is employed when the remaining uninterruptible power-supply apparatuses 12 to 16 are dismounted.

Firstly, at step P10 in FIG. 12, the first switch 55 and second switch 56 of the first uninterruptible power-supply apparatus 11 to be a dismounting target is turned off. This step is performed in such a manner that the above-described switching control unit 20 (see FIG. 10) outputs a switching signal $S_W$ to the first uninterruptible power-supply apparatus 11.

With this, the storage battery 53 of the first uninterruptible power-supply apparatus 11 is electrically disconnected from the storage battery 53 of the second uninterruptible power-supply apparatus 12.

Next, at step P11, an operator pulls out the input cable 34 and the output cable 35 from the power-supply unit 3 (see FIG. 1) to release the electrical connection between the direct current power line 60 and the first uninterruptible power-supply apparatus 11.

Thereafter, the first uninterruptible power-supply apparatus 11 is moved to the outside of the rack 2 along the guide rails 29 (see FIG. 5) to release the connected state between the respective connection portions 61, 62 and the fitting portions 41a, 42a. Accordingly, the first uninterruptible power-supply apparatus 11 is dismounted from the server system 1.

As described above, the operation of dismounting the first uninterruptible power-supply apparatus 11 is terminated.

The present example may easily dismount the first uninterruptible power-supply apparatus 11 by simply electrically disconnecting the storage battery 53 of the first uninterruptible power-supply apparatus 11 from the storage battery 53 of the second uninterruptible power-supply apparatus 12.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An uninterruptible power-supply apparatus comprising:
a storage battery including a first electrode and a second electrode;
an output unit configured to output a discharge current of the storage battery to an external power line to be a backup target;
a first connection portion configured to externally take out a voltage of the first electrode; and
a first switch provided between the first electrode and the first connection portion,
wherein the first switch is turned off when a voltage difference between the first connection portion and the first electrode is equal to or larger than a predetermined value, and is turned on when the voltage difference is smaller than the predetermined value.

2. The uninterruptible power-supply apparatus according to claim 1, further comprising a current control unit configured to selectively allow flow of any one of a charge current and the discharge current entering and exiting from the first electrode, and configured to supply the discharge current to the output unit,
wherein, when the first switch is in an off state, the current control unit allows the flow of the charge current to charge the storage battery.

3. The uninterruptible power-supply apparatus according to claim 1, further comprising a second connection portion electrically connected with the second electrode of the storage battery, and configured to externally take out a voltage of the second electrode.

4. The uninterruptible power-supply apparatus according to claim 3, further comprising a second switch provided between the second electrode and the second connection portion,
wherein the second switch is turned off when the voltage difference between the first connection portion and the first electrode is equal to or larger than a predetermined value and is turned on when the voltage difference is smaller than the predetermined value.

5. The uninterruptible power-supply apparatus according to claim 1, wherein
the first electrode is a positive electrode of the storage battery, and
the second electrode is a negative electrode of the storage battery.

6. A server system comprising:
a power line;
a server electrically connected with the power line; and
a plurality of uninterruptible power-supply apparatuses each including a storage battery including a first electrode and a second electrode, an output unit configured to output a discharge current of the storage battery to the power line,
a first connection portion electrically connected with the first electrode; and
a first switch electrically connecting the first electrode with the first connection portion,
wherein the first switch is turned off when a voltage difference between the first connection portion and the first electrode is equal to or larger than a predetermined value and is turned on when the voltage difference is smaller than the predetermined value,
wherein the respective first connection portions of the plurality of uninterruptible power-supply apparatuses are electrically connected with one another.

7. The server system according to claim 6, further comprising:
a rack configured to accommodate the power line, the server, and the plurality of uninterruptible power-supply apparatuses; and
a first wiring provided on an inner wall of the rack, and electrically connected with each of the first connection portions of the plurality of uninterruptible power-supply apparatuses.

8. The server system according to claim 7, further comprising a first fitting portion to which the first connection portion is fitted, provided to the first wiring,
wherein the first connection portion and the first wiring are electrically connected with each other by fitting the first connection portion and the first fitting portion to each other.

9. The server system according to claim 8, further comprising a guide provided on an inner wall of the rack, and configured to guide the uninterruptible power-supply apparatuses to an inside of the rack, wherein, when the uninterruptible power-supply apparatuses are accommodated in the rack along the guide, the first connection portion and the first fitting portion are fitted to each other.

10. The server system according to claim 6, further comprising a current control unit provided in the inside of each of the plurality of uninterruptible power-supply apparatuses, and configured to selectively allow flow of any one of a charge current and the discharge current entering and exiting from the first electrode, and configured to supply the discharge current to the output unit, wherein, when the first switch is in an off state, the current control unit allows the flow of the charge current to charge the storage battery.

11. The server system according to claim 6, further comprising a switching control unit configured to control switching on and off of the first switch.

12. The server system according to claim 6, further comprising a second connection portion provided in each of the plurality of uninterruptible power-supply apparatuses, and electrically connected with the second electrode of the storage battery, wherein the respective second connection portions of the plurality of uninterruptible power-supply apparatuses are electrically connected with one another.

13. The server system according to claim 12, further comprising:

a rack configured to accommodate the power line, the server, and the plurality of uninterruptible power-supply apparatuses; and a second wiring provided on an inner wall of the rack, and electrically connected with each of the second connection portions of the plurality of uninterruptible power-supply apparatuses.

14. The server system according to claim 13, further comprising a second fitting portion to which the second connection portion is fitted, provided to the second wiring, wherein the second connection portion and the second wiring are electrically connected with each other by fitting the second connection portion and the second fitting portion to each other.

15. A method of using an uninterruptible power-supply apparatus, the method comprising:

electrically connecting a first storage battery of a first uninterruptible power-supply apparatus and a second storage battery of a second uninterruptible power-supply apparatus with a power line to be a backup target; and electrically connecting the first storage battery and the second storage battery in parallel, wherein, when the first uninterruptible power-supply apparatus is electrically connected with the power line, it is determined whether or not a voltage difference between the first storage battery and the second storage battery is smaller than a predetermined value in a state where the first storage battery and the second storage battery are electrically disconnected, and when it is determined that the voltage difference is equal to or larger than the predetermined value, a charge current is supplied from the power line to the first storage battery to charge the first storage battery, and when the voltage difference becomes smaller than the predetermined value due to the charging, the first storage battery and the second storage battery are electrically connected in parallel.

16. The method of using an uninterruptible power supply apparatus according to claim 15, wherein, when the first uninterruptible power-supply apparatus is dismounted from the power line, the first storage battery is electrically disconnected from the second storage battery before the dismounting.

17. The method of using an uninterruptible power-supply apparatus according to claim 15, wherein, a current control unit is provided between the power line and the first storage battery, the current control unit selectively allowing flow of any one of a charge current and a discharge current entering and exiting form the first storage battery, and supplying the discharge current to the power line.

\* \* \* \* \*